US011580758B2

(12) United States Patent
Yang et al.

(10) Patent No.: US 11,580,758 B2
(45) Date of Patent: Feb. 14, 2023

(54) METHOD FOR PROCESSING IMAGE, ELECTRONIC DEVICE, AND STORAGE MEDIUM

(71) Applicant: Fulian Precision Electronics (Tianjin) Co., LTD., Tianjin (CN)

(72) Inventors: Cheng-Ju Yang, Taipei (TW); Wan-Hsin Tarng, New Taipei (TW); Pei-Chen Wu, Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 237 days.

(21) Appl. No.: 17/083,816

(22) Filed: Oct. 29, 2020

(65) Prior Publication Data

US 2022/0051041 A1 Feb. 17, 2022

(30) Foreign Application Priority Data

Aug. 13, 2020 (CN) .......................... 202010815083.5

(51) Int. Cl.
| | |
|---|---|
| *G06V 20/62* | (2022.01) |
| *G06V 10/44* | (2022.01) |
| *G06V 30/224* | (2022.01) |
| *G06K 9/62* | (2022.01) |
| *G06T 5/00* | (2006.01) |
| *G06T 7/11* | (2017.01) |

(Continued)

(52) U.S. Cl.
CPC .......... *G06V 20/62* (2022.01); *G06K 9/6215* (2013.01); *G06T 5/002* (2013.01); *G06T 7/11* (2017.01); *G06V 10/443* (2022.01); *G06V 30/224* (2022.01); *G06T 7/001* (2013.01); *G06T 2207/30148* (2013.01); *G06T 2207/30168* (2013.01); *G06V 30/10* (2022.01)

(58) Field of Classification Search
CPC .... G06V 20/62; G06V 10/443; G06V 30/224; G06V 30/10; G06T 7/001; G06T 5/002; G06T 7/11; G06T 2207/30148; G06T 2207/30168; G06K 9/6215
See application file for complete search history.

(56) References Cited

U.S. PATENT DOCUMENTS

| | | | | |
|---|---|---|---|---|
| 2009/0245620 | A1* | 10/2009 | Joo | .......................... G06T 7/001 |
| | | | | 382/145 |
| 2018/0025256 | A1* | 1/2018 | Bai | .................. G06V 30/19173 |
| | | | | 382/229 |
| 2019/0213725 | A1* | 7/2019 | Liang | ...................... G06T 7/001 |

FOREIGN PATENT DOCUMENTS

CN 111474184 A * 7/2020

* cited by examiner

*Primary Examiner* — Ping Y Hsieh
*Assistant Examiner* — Daniella M. DiGuglielmo
(74) *Attorney, Agent, or Firm* — ScienBiziP, P.C.

(57) ABSTRACT

An image processing method for identifying text on production line components obtains an image to be recognized and a standard image for reference and extracts a first text area of the image to be recognized. A second text area of the standard image is obtained, and a text window is extracted based on the second text area. The method further obtains a target text area of the image to be recognized based on the first text area and the text window, and obtains a first set of first text sub-areas, and obtains a second set of second text sub-areas, by dividing the second text area into sub-windows of the text window. The method further marks the image to be recognized as a qualifying image when each first text sub-area of the first set is the same as a corresponding second text sub-area of the second set.

20 Claims, 7 Drawing Sheets

(51) Int. Cl.
*G06V 30/10* (2022.01)
*G06T 7/00* (2017.01)

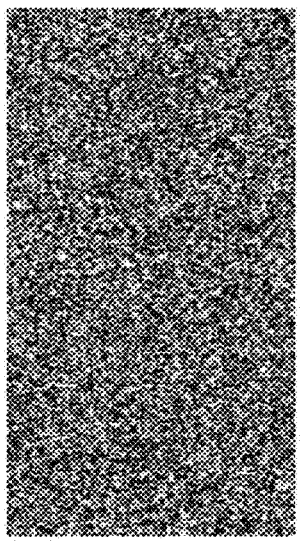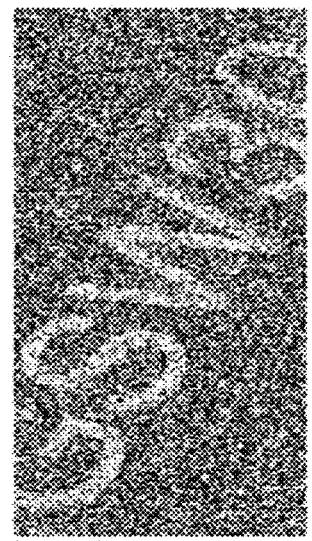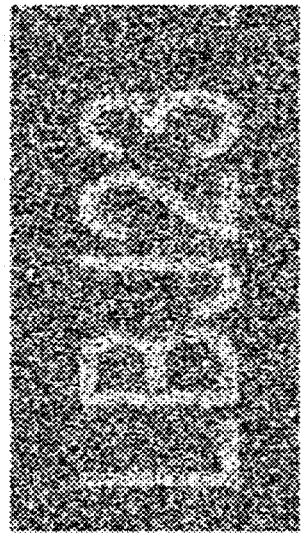
FIG. 5A
FIG. 5B
FIG. 5C
FIG. 5D
FIG. 5E
FIG. 5F

Training data
Predict result

|  | PASS | FAIL |
|---|---|---|
| Real result PASS | 246 | 6 |
| Real result FAIL | 0 | 134 |

Underkill rate: 0%
Overkill rate: 2.3%

Verification data
Predict result

|  | PASS | FAIL |
|---|---|---|
| Real result PASS | 178 | 5 |
| Real result FAIL | 1 | 129 |

Underkill rate: 0.7%
Overkill rate: 2.7%

FIG. 7

METHOD FOR PROCESSING IMAGE, ELECTRONIC DEVICE, AND STORAGE MEDIUM

CROSS-REFERENCE TO RELATED APPLICATIONS

This application claims priority to Chinese Patent Application No. 202010815083.5 filed on Aug. 13, 2020, the contents of which are incorporated by reference herein.

FIELD

The subject matter herein generally relates to image processing technology.

BACKGROUND

Automated Optical Inspection (AO') is a visual inspection of manufactured printed circuit board carried out automatically. It is a high-speed and high-precision optical image detection system that uses machine vision to compare an object to be tested against a standard image to determine whether the object meets certain standards. AOI machines are commonly used in SMT (Surface Mount Technology) assembly lines to inspect the quality of parts on the circuit board after PCB assembly, or to check whether solder paste meets standards after being pasted. An AOI machine engineer will set the inspection standards for each test object. If the standard is set too strictly, the false alarm rate is too high; if the standard is set too loose, defects may be missed. At present, products that are detected as defective by AOI need to be further examined by manual vision to determine whether the object under test (such as circuit board) is defective, the result of manual vision prevailing.

For example, when the current AOI machine detects IC components, it will use the text on the component to confirm whether the component is correct and qualified. Generally, the testing standards in examining the text on the components are strict. For the same IC components, the engraved text is the same, but the font type of the same text may be different because the components are supplied by different manufacturers, which can result in finding as defective after inspection by the AOI machine. Then engineers are required to reconfirm the inspection standards or to add standard images to adjust the ignorance or narrow view of AOI machines caused by different fonts, resulting in a decrease in the overall production line efficiency.

SUMMARY OF THE INVENTION

In order to solve the problem in the prior art, one embodiment of the present disclosure provides an electronic device. The electronic device includes at least one processor, and a storage device storing one or more programs. When the one or more programs are executed by the at least one processor, the at least one processor is caused to: obtain an image to be recognized and a standard image; extract a first text area of the image to be recognized; obtain a second text area of the standard image, and extract a text window based on the second text area, the text window comprising a plurality of sub-windows; obtain a target text area of the image to be recognized based on the first text area and the text window; obtain a first set of first text sub-areas by dividing the target text area based on the plurality of sub-windows, and obtain a second set of second text sub-areas by dividing the second text area based on the plurality of sub-windows; determine whether each first text sub-area of the first set is the same as a corresponding second text sub-area of the second set; and mark the image to be recognized as a qualifying image in response that each first text sub-area of the first set is the same as the corresponding second text sub-area of the second set.

In order to solve the problem in the prior art, another embodiment of the present disclosure provides an image processing method applicable in an electronic device. The method includes: obtaining an image to be recognized and a standard image; extracting a first text area of the image to be recognized; obtaining a second text area of the standard image, and extracting a text window based on the second text area, the text window comprising a plurality of sub-windows; obtaining a target text area of the image to be recognized based on the first text area and the text window; obtaining a first set of first text sub-areas by dividing the target text area based on the plurality of sub-windows, and obtaining a second set of second text sub-areas by dividing the second text area based on the plurality of sub-windows; determining whether each first text sub-area of the first set is the same as a corresponding second text sub-area of the second set; and marking the image to be recognized as a qualifying image in response that each first text sub-area of the first set is the same as the corresponding second text sub-area of the second set.

In order to solve the problem in the prior art, another embodiment of the present disclosure provides a non-transitory storage medium. The non-transitory storage medium is stored with instructions. When the instructions are executed by at least one processor of an electronic device, the at least one processor is caused to perform an image processing method, the method includes: obtaining an image to be recognized and a standard image; extracting a first text area of the image to be recognized; obtaining a second text area of the standard image, and extracting a text window based on the second text area, the text window comprising a plurality of sub-windows; obtaining a target text area of the image to be recognized based on the first text area and the text window; obtaining a first set of first text sub-areas by dividing the target text area based on the plurality of sub-windows, and obtaining a second set of second text sub-areas by dividing the second text area based on the plurality of sub-windows; determining whether each first text sub-area of the first set is the same as a corresponding second text sub-area of the second set; and marking the image to be recognized as a qualifying image in response that each first text sub-area of the first set is the same as the corresponding second text sub-area of the second set. The present disclosure greatly reduces the error rate of the AOI machine and greatly improves the overall production line efficiency. The present disclosure greatly reduces the error rate of the AOI machine and greatly improves the overall production line efficiency.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 5A to FIG. 5F show images to be recognized.

FIG. 7 illustrates a confusion matrix of the present disclosure.

DETAILED DESCRIPTION

Figure 1:
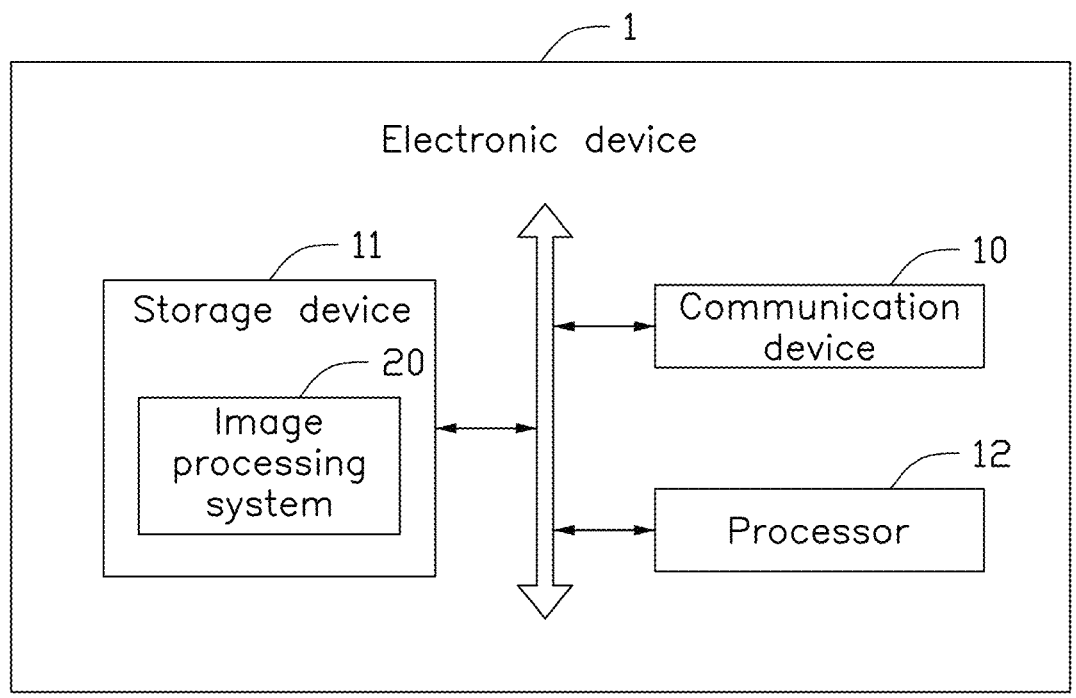
FIG. 1 shows a schematic block diagram of one embodiment of an electronic device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module" as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs. BLU-RAY™, flash memory, and hard disk drives. The term "comprises" means "including, but not necessarily limited to"; it specifically indicates open-ended inclusion or membership in a so-described combination, group, series, and the like.

FIG. 1 illustrates one embodiment of an electronic device of the present disclosure (electronic device 1). In one embodiment, an image processing system 20 can be run in electronic device 1. The electronic device 1 can include, but is not limited to, a communication device 10, a storage device 11, and at least one processor 12. The above components electronically communicate with each other.

In at least one embodiment, the communication device 10 provides network communication for the electronic device 1. The network may be a wired network or a wireless network, such as radio, cellular, satellite, broadcasting, etc.

In at least one embodiment, the electronic device 1 may communicate with an AOI machine (not shown) through the communication device 10.

In one embodiment, the electronic device 1 may be an electronic device installed with an image processing program, such as a computer, a smart phone, a personal computer, a server, and so on.

It should be noted that the structure of the electronic device 1 shown in FIG. 1 does not constitute a limitation of the embodiment. The electronic device 1 may also include more or less other hardware or software than that of FIG. 1, or have different component arrangements.

It should be noted that the electronic device 1 is only an example. If other existing or future electronic devices can be adapted, they should also be included in the protection scope and included here by reference.

Figure 2:
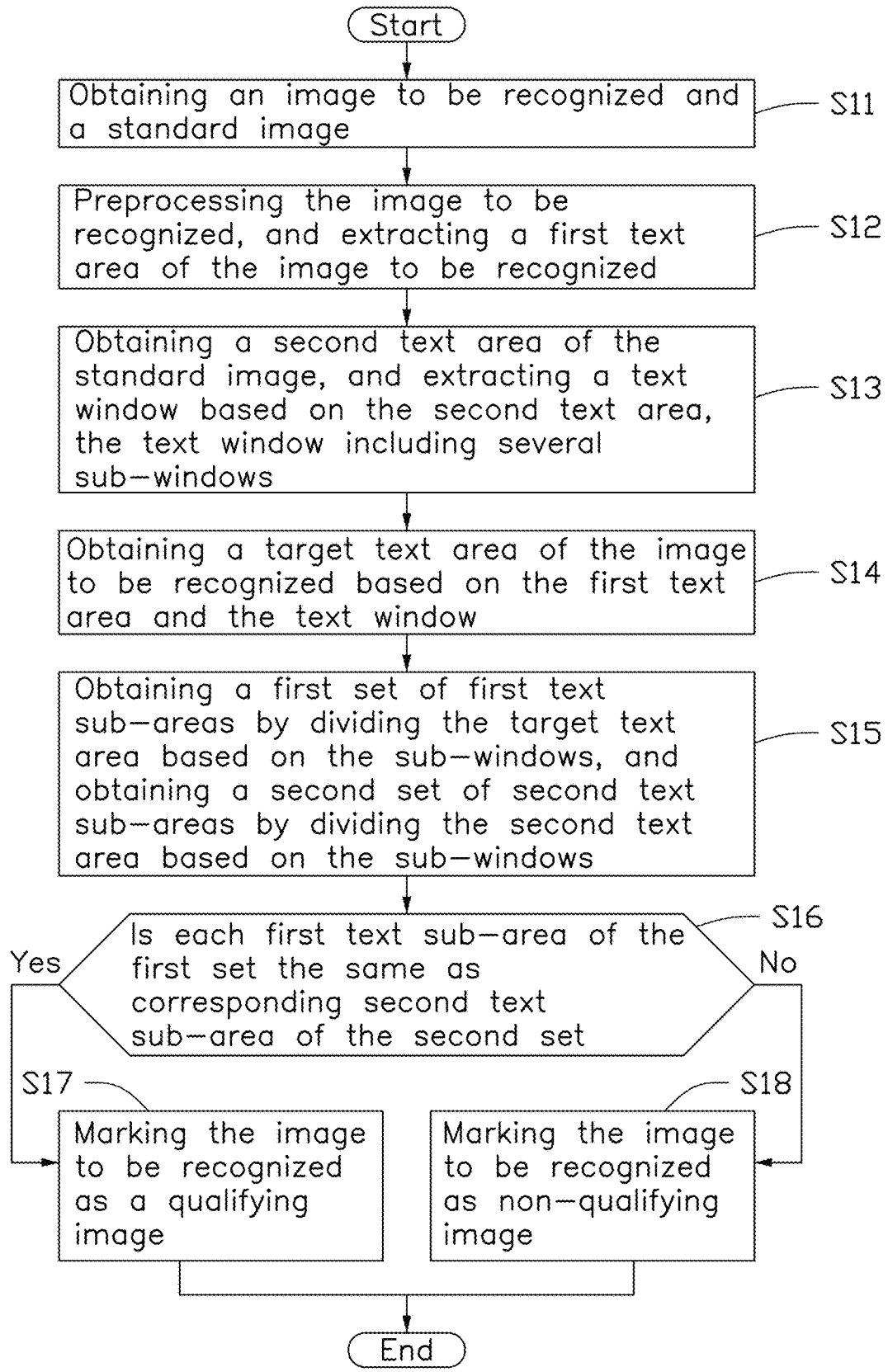
FIG. 2 illustrates a flowchart of one embodiment of an image processing method of the present disclosure.

FIG. 2 illustrates a flowchart of one embodiment of an image processing method of the present disclosure. In one embodiment, the image processing method can be applied in the electronic device 1. Referring to FIG. 2, the method is provided by way of example, as there are a variety of ways to carry out the method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S11.

At block S11, obtaining an image to be recognized and a standard image.

In this embodiment, when using the AOI machine to analyze IC products, text on the IC components will be used for determining whether the IC products are of the same or of an acceptable type. It is understandable that the text in each of the IC products of the same type will be pasted in the same preset position. The AOI machine can obtain the preset position information when detecting the IC components, so that the image be recognized and the standard image including a text area can be obtained. The image to be recognized and the standard image are images obtained according to the same type of product (e.g., the IC products). The image to be recognized is an image obtained from the AOI machine. The text on the standard image is clear and complete, the text is not skewed or greatly shifted, the light source is normal, and the picture is clear.

It can be understood that both the image to be recognized and the standard image include many pixels. The pixel refers to divisions of an image, into a number of small squares, and each small square is called a pixel. The electronic device 1 can represent the entire image by controlling the position, color, and brightness of the pixels.

At block S12, preprocessing the image to be recognized, and extracting a first text area of the image to be recognized.

In one embodiment, in order to highlight the first text area in the image to be recognized, firstly preprocessing the image to be recognized. The preprocessing of the image to be recognized includes:

(1) filtering the image to be recognized through a filter. In this embodiment, the filter can filter out noise, to preserve main features of the image to be recognized as much as possible and remove unnecessary noise information that affects subsequent processing.

(2) enhancing the first text area by image enhancement technology.

In this embodiment, the first text area may become blurred after noise is removed by the filter. It is necessary to use image enhancement technology to enhance the first text area so that the text in the first text area is more obvious. For example, if there are high frequency components in the image to be recognized and these are enhanced, an outline of the first text area in the image can be clear and the details rendered more obvious.

(3) binarizing the image to be recognized.

In this embodiment, by binarizing the image to be recognized, the image to be recognized can be converted into a black and white image, so as to facilitate distinguishing the first text area and the background area.

(4) obtaining the first text area in the image to be recognized.

In this embodiment, the electronic device 1 recognizes the image to be recognized through a 8-connected component method, and obtains several connected objects. The electronic device 1 calculates sizes of areas of the connected objects, and deletes those whose areas are smaller than a preset area of the connected objects. The electronic device 1 cuts out the text on the image to be recognized, and frames all text with the smallest circumscribed rectangle. Then, the smallest circumscribed rectangle is the first text area in the image to be recognized. It can be understood that the method for obtaining the first text area in the image to be recognized is not limited to the above method.

In this embodiment, in order to ensure that each image to be recognized is noise-treated and with enhanced text area, the above steps (1) and (2) can be used alternately.

At block S13, obtaining a second text area of the standard image, and extracting a text window based on the second text area, the text window including several sub-windows.

In at least one embodiment, the method for obtaining the second text area in the standard image is the same as the method for obtaining the first text area in the image to be recognized, and will not be repeated here.

Figure 3:
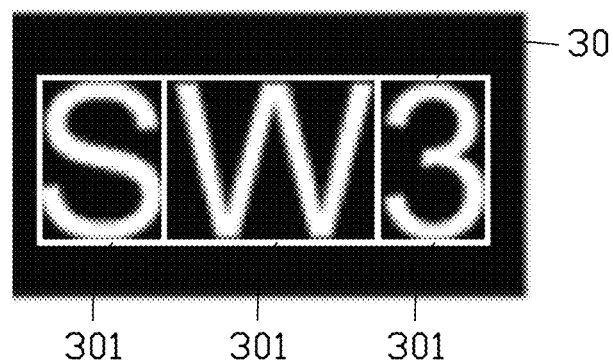
FIG. 3 illustrates a standard image.

It should be noted that the text window is a circumscribed rectangle of the smallest area that contains all the pixels of the first text area, extracted from the standard image. The text window includes several sub-windows, and each sub-window is a circumscribed rectangle with the smallest area of the pixels in each character area in the first text area. For example, as shown in FIG. 3, the second text area in the standard image contains the text "SW3", that is, the circumscribed rectangle with the smallest area of the pixels in the area corresponds to all of the second text "SW3" in the standard image. The text window 30 includes three sub-windows 301, and these three sub-windows 301 correspond to the letter "S", the letter "W", and the number "3" respectively.

At block S14, obtaining a target text area of the image to be recognized based on the first text area and the text window.

In at least one embodiment, the first text area may include more text information than the second text area in the standard image. In order to find the same text information in the first text area as in the standard image, the electronic device 1 can slide the text window 30 in the first text area, to find the same text information as in the standard image.

In one embodiment, obtaining a target text area of the image to be recognized based on the first text area and the text window includes:

(1) extracting a second text area of the standard image.

(2) obtaining an object area of the first text area, the object area having the highest similarity to the second text area. In one embodiment, the second text area is used to match the first text area to find the object area in the first text area with the highest similarity value to the second text area. In this embodiment, each pixel in the second text area is used to match each pixel in the first text area from left to right and from top to bottom, to find the object area.

In at least one embodiment, a similarity value index defined in this application includes the similarity value measures commonly used to calculate the similarity value between different samples. These measures may include the reciprocal of distance (including Euclidean distance, Manhattan distance, Hamming distance, etc.), correlation coefficient (Correlation coefficient), structural similarity value (SSIM, Structural Similarity value), Complex Wavelet Structural Similarity value (CW-SSIM, Complex Wavelet SSIM) and Cosine Similarity value, and so on. According to different situations, the electronic device will use different similarity value indexes to facilitate subsequent text detection and comparison.

(3) obtaining the target text area by using the text window 30 to select the object area in the first text area.

Figure 4:
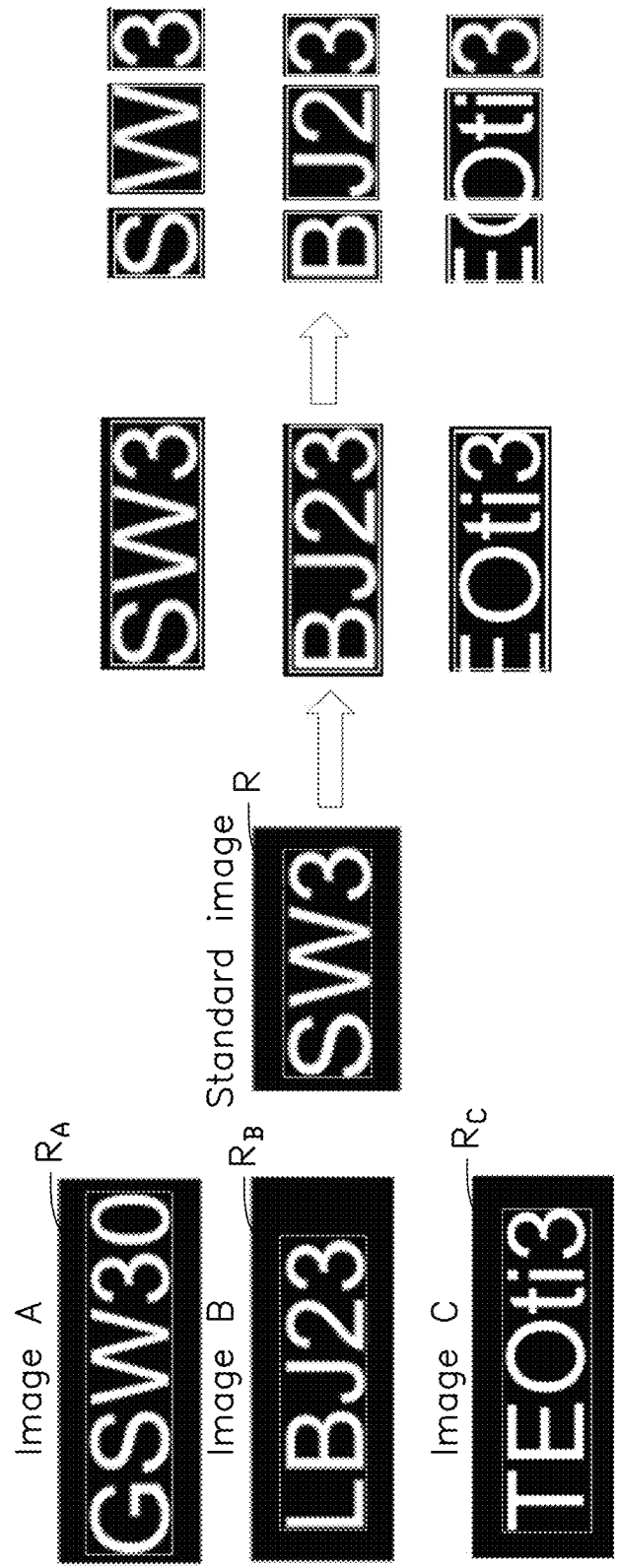
FIG. 4 illustrates a second text sub-area obtained by matching the image to be recognized with the standard image, according to the present disclosure.

For example, in FIG. 4, the first text area $R_A$ of the image to be recognized (image A) includes characters "GSW30", the first text area $R_B$ of the image to be recognized (image B) includes characters "LBJ23", the first text area $R_C$ of the image to be recognized (image C) includes characters "TEOti3", and the second text area R of the standard image include characters "SW3". The electronic device 1 extracts the second text area R from the standard image, the second text area R including characters "SW3", finds an area including characters "SW3" in the first text area $R_A$ by using the second text area R matching the first text area $R_A$, and obtains the target text area including characters "SW3" by using the text window to select the area of the first text area $R_A$. The electronic device 1 finds an area including characters "BJ23" in the first text area $R_B$ by using the second text area R matching the first text area $R_B$, and obtains the target text area including characters "BJ23" by using the text window 30 to select the area of the first text area $R_B$. The electronic device 1 finds an area including a part of letter "E" and characters "Oti3" in the first text area $R_C$ by using the second text area R matching the first text area $R_C$, and obtains the target text area including the part of letter "E" and the characters "Oti3" by using the text window 30 to select the area of the first text area $R_C$.

It should be noted that the target text area does not necessarily need to include complete characters, but the first text area is selected according to the size of the text window 30 to obtain the target text area.

At block S15, obtaining a first set of first text sub-areas by dividing the target text area based on the sub-windows, and obtaining a second set of second text sub-areas by dividing the second text area, based on the sub-windows.

In this embodiment, for more accurate comparison as to whether the target text area is the same as the second text area, the target text area needs to be divided and compared one by one. The electronic device 1 can obtain the first set of first text sub-areas by dividing the target text area based on the sub-windows. For example, in FIG. 4, the text window of the standard image includes three sub-windows. The electronic device 1 divides the target text area of the image A into the three sub-windows, and obtains the first set of first text sub-areas. The first set of first text sub-areas includes a first text sub-area including the letter "S", and a first text sub-area including the letter "W", and a first text sub-area including the number "3". The electronic device 1 divides the target text area of the image B through the three sub-windows, and obtains the first set of first text sub-areas. The first set of first text sub-areas includes a first text sub-area including the letter "B", and a first text sub-area including the letter "J" and the number "2", and a first text sub-area including the number "3". The electronic device 1 divides the target text area of the image C through the three sub-windows, and obtains the first set of first text sub-areas. The first set of first text sub-areas includes a first text sub-area including the part of the letter "E" and the part of the letter "O", and a first text sub-area including the other part of letter "O" and the letters "ti", and a first text sub-area including the number "3".

In at least one embodiment, the electronic device 1 divides the second text area of the standard image based on the three sub-windows, and obtains the second set of second text sub-areas. The second set of second text sub-areas includes a second text sub-area including the letter "S", and a second text sub-area including the letter "W", and a second text sub-area including the number "3".

It should be noted that the first text sub-area and the second text sub-area do not necessarily include complete characters. A size of the first text sub-area and a size of the second text sub-area is determined by the size of the sub-windows in the text window 30.

At block S16, determining whether each first text sub-area of the first set is the same as corresponding second text sub-area of the second set.

In at least one embodiment, the electronic device 1 determines whether the image to be recognized is a qualifying image by determining whether each first text sub-area of the first set is the same as the corresponding second text sub-area of the second set. If each first text sub-area of the first set is the same as the corresponding second text sub-area of the second set, the process goes to block S17. If there is a first text sub-area of the first set different from corresponding second text sub-area of the second set, the process goes to block S18.

In at least one embodiment, determining whether each first text sub-area of the first set is the same as the corresponding second text sub-area of the second set includes:

(a) calculating a similarity value between each first text sub-area of the first set and the corresponding second text sub-area of the second set, and obtaining a set of similarities.

(1) inputting the each first text sub-area of the first set and the second text sub-area of the second set to a preset classifier to identify each first text sub-area, the preset classifier being obtained after training characters of the image to be recognized, and various English alphabet and numbers are additionally collected.

(2) obtaining a first feature value of the each first text sub-area by the preset classifier, and obtaining a second feature value of the each second text sub-area by the preset classifier. For example, obtaining the first feature value $T_{10}$ of the first text sub-area including letter "S" of the image A by the preset classifier, and obtaining the first feature value $T_{11}$ of the first text sub-area including letter "W" of the image A by the preset classifier, and obtaining the first feature value $T_{12}$ of the first text sub-area including number "3" of the image A by the preset classifier. The electronic device 1 obtains the first feature value $T_{20}$ of the first text sub-area including letter "B" of the image B by the preset classifier, and obtains the first feature value $T_{21}$ of the first text sub-area including characters "J2" of the image B by the preset classifier, and obtains the first feature value $T_{22}$ of the first text sub-area including number "3" of the image B by the preset classifier. The electronic device 1 obtains the first feature value $T_{30}$ of the first text sub-area including part of the letter "E" and part of letter "O" of the image C by the preset classifier, and obtains the first feature value $T_{31}$ of the first text sub-area including part of the letter "O" and letters of the image C by the preset classifier, and obtains the first feature value $T_{32}$ of the first text sub-area including number "3" of the image C by the preset classifier.

In one embodiment, the electronic device 1 obtains the second feature value $T_{00}$ of the second text sub-area including letter "S" of the standard image by the preset classifier, and obtains the second feature value $T_{01}$ of the second text sub-area including the letter "W" of the standard image by the preset classifier, and obtains the second feature value $T_{02}$ of the second text sub-area including number "3" oft the standard image by the preset classifier.

(3) calculating the similarity value between each first feature value and corresponding second feature value, and obtaining the set of similarities based on the similarity value. For example, the electronic device 1 calculates the similarity value between each first text sub-area of the first set of the image A and corresponding second text sub-area of the second set of the standard image, and obtains the set of similarities. The electronic device 1 calculates the similarity value between the first feature value $T_{10}$ and the second feature value $T_{00}$, and obtains a similarity value $S_{00}$. The electronic device 1 calculates the similarity value between the first feature value and the second feature value $T_{01}$, and obtains a similarity value $S_{01}$. The electronic device 1 calculates the similarity value between the first feature value $T_{12}$ and the second feature value $T_{02}$, and obtains a similarity value $S_{02}$. Thus, the electronic device 1 obtains the set of similarities $\{S_{00}, S_{01}, S_{02}\}$. The electronic device 1 calculates the similarity value between each first text sub-area of the first set of the image B and corresponding second text sub-area of the second set of the standard image, and obtains the set of similarities. The electronic device 1 calculates the similarity value between the first feature value $T_{20}$ and the second feature value $T_{00}$, and obtains a similarity value $S_{10}$. The electronic device 1 calculates the similarity value between the first feature value $T_{21}$ and the second feature value $T_{01}$, and obtains a similarity value $S_{11}$. The electronic device 1 calculates the similarity value between the first feature value $T_{22}$ and the second feature value $T_{02}$, and obtains a similarity value $S_{12}$. Thus, the electronic device 1 obtain the set of similarities $\{S_{10}, S_{11}, S_{12}\}$. Also, the electronic device 1 can calculate the similarity value between each first text sub-area of the first set of the image C and corresponding second text sub-area of the second set of the standard image, and obtains the set of similarities.

(b) determining whether each similarity value of the set of similarities is greater than or equal to a predetermined value. If each similarity value of the set of similarities is greater than or equal to a predetermined value, it is determined that each first text sub-area of the first set is the same as corresponding second text sub-area of the second set. That is, the first text area of the image to be recognized is determined to be the same as the second text area of the standard image, and the process goes to block S17. If there is a similarity value of the set of similarities less than the predetermined value, it is determined that there is a first text sub-area of the first set different from corresponding second text sub-area of the second set. That is, the first text area of the image to be recognized is determined to be different from the second text area of the standard image, and the process goes to block S18.

For example, if the similarity values $S_{00}$, $S_{01}$, and $S_{02}$ are greater than or equal to the predetermined value, the process goes to block S17. If the similarity value $S_{00}$, or $S_{01}$, or $S_{02}$ is less than the predetermined value, the process goes to block S18.

At block S17, marking the image to be recognized as a qualifying image.

In at least one embodiment, if each of the similarity value of the set of similarities is greater than or equal to the predetermined value, it is determined that the characters of the target text area of the image to be recognized are the same as the characters of the second text area of the standard image, and the electronic device 1 can mark the image to be recognized as a qualifying image. For example, if the characters of the target text area of the image A are the same as the characters of the second text area of the standard image, the electronic device 1 can mark the image A as a qualifying image.

In one embodiment, the image processing method can output first prompt information to indicate that the image to be recognized is a qualifying image. For example, the electronic device 1 outputs "Pass" prompt that the image to be recognized is a qualifying image. In other words, the test object corresponding to the image A to be recognized is a qualified test object.

At block S18, marking the image to be recognized as a non-qualifying image.

In at least one embodiment, if there is a similarity value of the set of similarities less than the predetermined value, it is determined that the characters of the target text area of the image to be recognized are different from the characters of the second text area of the standard image. The electronic device 1 then marks the image to be recognized as a unqualified image. For example, if the characters of the target text area of the image B are different from the characters of the second text area of the standard image, the electronic device 1 can mark the image B as a non-qualifying image.

In one embodiment, marking the image to be recognized as unqualified includes several possible situations. For example, the text on the image to be recognized is different from the text on the standard image, as shown in FIG. 5A. It is then determined that the object to be tested corresponding to the image to be recognized and the object to be tested corresponding to the standard image are not of the same type. For example, the test object corresponding to the image to be recognized and the test object corresponding to the standard image are IC components may be produced by different manufacturers, if the text on the image to be recognized is greatly shifted, as shown in FIG. 5B. The object to be measured corresponding to the image to be recognized is displaced, which is prone to error in subsequent use. For example, when the object to be measured corresponding to the image to be recognized is a square component, four vertices of the square component need to be soldered on the circuit board. If the image to be recognized corresponding to the square component appears as shown in FIG. 5B, then the four vertices of the square component cannot be soldered on the circuit board in preparation. For example, the text on the image to be recognized may be missing, as shown in FIG. 5C. Then, it is impossible to say whether the object to be recognized is of the same type as the object to be tested corresponding to the standard image. For example, the text on the image to be recognized is blurred as shown in FIG. 5D. Then, it is also impossible to say whether the object under test corresponding to the image to be recognized is the same as the object under test corresponding to the standard image. For example, the text on the image to be recognized is covered by a sticker or other foreign object, or the light source may be abnormal as shown in FIG. 5E. Then, it is confirmed that there may be other objects on the test object corresponding to the image to be recognized, which may affect the performance of the test object. For example, the image to be recognized is skewed, as shown in FIG. 5F. Then, the object under test may be skewed.

In one embodiment, the image processing method can output second prompt to warn that the image to be recognized is a unqualified image. For example, the electronic device 1 outputs "Fail" prompt that the image to be recognized is a unqualified image.

In summary, the image processing method provided in the present disclosure can extract the features of the image to be recognized by using the image processing method and the classifier, so that similar features can be extracted even though the text has different font types, and then the features are compared with features of the standard image. Then, the method determines whether the image to be recognized is a qualifying image. The present disclosure greatly reduces the error rate of the AOI machine and greatly improves the overall production line efficiency.

Figure 6:
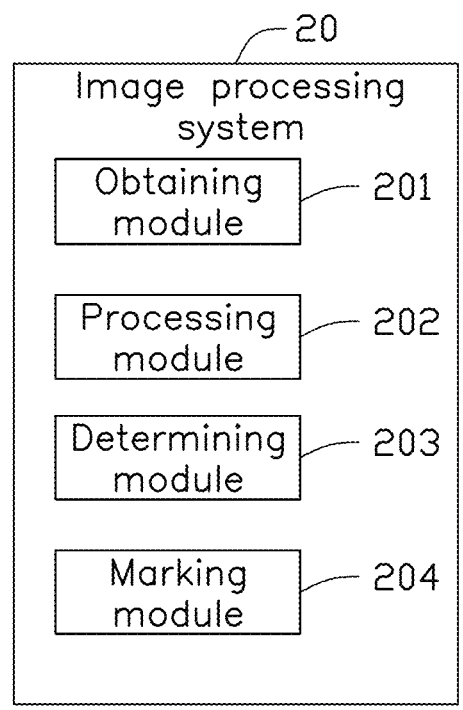
FIG. 6 shows modules of an image processing system of the present disclosure in one embodiment.

Referring to FIG. 6, in this embodiment, the image processing system 20 may be divided into one or more modules, and the one or more modules may be stored in the storage device 11 and used by the processor 12 perform the image processing method. The one or more modules may be a series of computer program instruction segments capable of completing specific functions, and the instruction segments are used to describe the execution process of the image processing system 20 in the electronic device 1. For example, the image processing system 20 may be divided into an obtaining module 201, a processing module 202, a determining module 203, and a marking module 204.

In this embodiment, the obtaining module 201 obtains an image to be recognized and a standard image; the processing module 202 extracts a first text area of the image to be recognized; the obtaining module 201 obtains a second text area of the standard image, and extracts a text window based on the second text area, and the text window comprises a plurality of sub-windows; the obtaining module 201 obtains a target text area of the image to be recognized based on the first text area and the text window; the obtaining module 201 obtains a first set of first text sub-areas by dividing the target text area based on the sub-windows, and obtains a second set of second text sub-areas by dividing the second text area based on the sub-windows; the determining module 203 determines whether each first text sub-area of the first set is the same as corresponding second text sub-area of the second set; the marking module 204 marks the image to be recognized as a qualifying image when each first text sub-area of the first set is the same as corresponding second text sub-area of the second set.

Due to the variability of production line data, the present disclosure also formulates a system update mechanism to enable the image processing system 20 to be automatically updated through continuously accumulated data, ensuring the accuracy of the model to achieve adaptability for various products.

In one embodiment, a result is generated after the image processing system 20 processes the image to be recognized, and the result can be compared with a result of manual processing of the image to be recognized. Then, detection indicators such as the accuracy rate, the missed detection rate, and the overkill rate can be calculated. When the detection indicators meet a standard set by the production line, this indicates that the image processing system 20 is stable, and new data of the production line (that is, the image to be recognized) will continue to be processed by the image processing system 20.

If the detection indicators do not meet the standard set, the image processing system 20 is activated to retrain the classifier for the production line data (that is, the image to be recognized), and strengthen the adaptability of the classifier to the production line data. Then, the image processing system 20 generates a retraining result, and compares the retraining result with the result of manual processing of the image to be recognized, and a new detection indicator is calculated, and so on until the detection indicator meets the requirements set by the production line. Then, the image processing system 20 is updated.

For example, the present disclosure provides a total number of 699 images to be recognized, the images being of IC-type text components. The 699 images are determined to be unqualified by an SMT-produced online of the AOI machine. There are 386 pieces of the 699 images selected as training data, these are used to develop the image processing system 20, and 313 pieces of the 699 images are used for verification and testing after the image processing system 20 is developed. FIG. 7 shows confusion matrixes of the present disclosure. A confusion matrix on the left in FIG. 7 records the results of the training data during the development of the image processing system. The real result of manual processing of the image to be recognized is that 252 images are qualified and marked as "PASS", and 134 images are unqualified and marked as "FAIL". The predict result of the image processing system 20 is that 246 images are qualified and marked as "PASS", and 140 images are unqualified and marked as "FAIL". 6 qualified images are mistakenly determined as unqualified images by the image processing system 20. It can be calculated that an underkill rate in the training data is 0/(0+134)=0%, and an overkill rate is 6/(246+6)=2.3%.

In this embodiment, a confusion matrix on the right in FIG. 7 records the results of the verification data when the image processing system was developed. The real result of manual processing of the image to be recognized is that 183 images are qualified and marked as "PASS", and 130 images are unqualified and marked as "FAIL". The predict result of the image processing system 20 includes 179 images being qualified and 1 qualified image being mistakenly determined as unqualified image by the image processing system 20. The predict result of the image processing system 20 further includes 134 images qualified and 5 qualified images being mistakenly taken as unqualified images by the image processing system 20. It can be calculated that the underkill rate in the verification data is 1/(1+129)=0.7%, and the overkill rate is 5/(178+5)=2.7%. It can be seen that in the verification data, an accuracy rate of the image processing system 20 is as high as 98%. The application of the image processing system 20 to the SMT production line can greatly reduce the time required for manual visual inspection and reduce the adjustment of AOI by production line engineers. Such machine parameters greatly improve efficiency and overall production line stability.

In at least one embodiment, the processor 12 may be a central processing unit (Central Processing Unit, CPU), or other general-purpose processors, digital signal processors (Digital Signal Processor, DSP), and application specific integrated circuits (Application Specific Integrated Circuits). Integrated Circuit, ASIC), Field-Programmable Gate Array (FPGA) or other programmable logic devices, discrete gates or transistor logic devices, discrete hardware components, etc. The general-purpose processor may be a microprocessor or the processor 12 may also be any other conventional processors.

If the modules in the image processing system 20 are implemented in the form of software functional units and sold or used as independent products, the modules can be stored in a computer readable storage medium. Based on this understanding, this application implements all or part of the processes in the above-mentioned embodiments and methods, and can also be completed by instructing relevant hardware through a computer program. The computer program can be stored in a computer-readable storage medium. When the computer program is executed by the processor, it can implement the steps of the foregoing method embodiments. The computer program includes computer program code, and the computer program code may be in the form of source code, object code, executable file, or some intermediate forms. The computer-readable medium may include: any entity or device capable of carrying the computer program code, recording medium, U disk, mobile hard disk, magnetic disk, optical disk, computer memory, read-only memory (ROM, Read-Only Memory), Random Access Memory (RAM, Random Access Memory), electric carrier signal, telecommunications signal, software distribution medium, etc. It should be noted that the content contained in the computer-readable medium can be appropriately added or deleted according to the requirements of the legislation and patent practice in the jurisdiction. For example, in some jurisdictions, according to the legislation and patent practice, the computer-readable medium does not include electrical carrier signals and telecommunication signals.

In at least one embodiment, the storage device 11 can be used for storing program code and various data, for example, storing the program code of the image processing system 20 installed in the electronic device 1, and achieving high speed automatically access to programs and data during the operation of the electronic device 1.

The storage device may include a random access memory, and may also include a non-volatile memory, such as a hard disk, a memory, a plug-in hard disk, a Smart Media Card (SMC), a Secure Digital (SD) card, Flash card, at least one disk storage device, flash memory device, or other volatile solid-state storage device.

It should be emphasized that the above-described embodiments of the present disclosure, including any embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
   at least one processor, and
   a storage device that stores one or more programs, which when executed by the at least one processor, causes the at least one processor to:
   obtain an image to be recognized and a standard image;
   extract a first text area of the image to be recognized;
   obtain a second text area of the standard image, and extract a text window based on the second text area, the text window comprising a plurality of sub-windows;
   obtain a target text area of the image to be recognized based on the first text area and the text window;
   obtain a first set of first text sub-areas by dividing the target text area based on the plurality of sub-windows, and obtain a second set of second text sub-areas by dividing the second text area based on the plurality of sub-windows;
   determine whether each first text sub-area of the first set is the same as a corresponding second text sub-area of the second set; and mark the image to be recognized as a qualifying image in response that each first text sub-area of the first set is the same as the corresponding second text sub-area of the second set.

2. The electronic device according to claim 1, wherein obtaining the target text area of the image to be recognized based on the first text area and the text window comprises:
    extracting the second text area of the standard image;
    obtaining an object area of the first text area, wherein the object area is with a highest similarity to the second text area; and
    obtaining the target text area by using the text window to select the object area of the first text area.

3. The electronic device according to claim 1, wherein determining whether each first text sub-area of the first set is the same as the corresponding second text sub-area of the second set comprises:
    calculating a similarity value between each first text sub-area of the first set and the corresponding second text sub-area of the second set, and obtaining a set of similarities;
    determining whether each similarity value in the set of similarities is greater than or equal to a predetermined value;
    determining that each first text sub-area of the first set is the same as the corresponding second text sub-area of the second set in response that each of the similarity value in the set of similarities is greater than or equal to the predetermined value; or
    determining that the first text sub-area of the first set is different from the corresponding second text sub-area of the second set in response that any similarity value of the set of similarities is less than the predetermined value.

4. The electronic device according to claim 3, wherein obtaining the set of similarities comprises:
    inputting each first text sub-area of the first set and each second text sub-area of the second set to a preset classifier;
    obtaining a first feature value of each first text sub-area by the preset classifier, and obtaining a second feature value of each second text sub-area by the preset classifier;
    calculating a similarity value between each first feature value and a corresponding second feature value, and
    obtaining the set of similarities based on the similarity value between each first feature value and the corresponding second feature value.

5. The electronic device according to claim 1, wherein the at least one processor is further caused to:
    mark the image to be recognized as a non-qualifying image in response that the first text sub-area of the first set is different from the corresponding second text sub-area of the second set.

6. The electronic device according to claim 5, wherein the at least one processor is further caused to:
    filter the image to be recognized;
    enhance the first text area; and
    binarize the image to be recognized.

7. The electronic device according to claim 6, wherein the at least one processor is further caused to:
    output first prompt information to prompt that the image to be recognized is the qualifying image; and
    output second prompt information to prompt that the image to be recognized is the non-qualifying image.

8. An image processing method applicable in an electronic device, the method comprising:
    obtaining an image to be recognized and a standard image;
    extracting a first text area of the image to be recognized;
    obtaining a second text area of the standard image, and extracting a text window based on the second text area, the text window comprising a plurality of sub-windows;
    obtaining a target text area of the image to be recognized based on the first text area and the text window;
    obtaining a first set of first text sub-areas by dividing the target text area based on the plurality of sub-windows, and obtaining a second set of second text sub-areas by dividing the second text area based on the plurality of sub-windows;
    determining whether each first text sub-area of the first set is the same as a corresponding second text sub-area of the second set; and
    marking the image to be recognized as a qualifying image in response that each first text sub-area of the first set is the same as the corresponding second text sub-area of the second set.

9. The method according to claim 8, wherein obtaining the target text area of the image to be recognized based on the first text area and the text window comprises:
    extracting the second text area of the standard image;
    obtaining an object area of the first text area, wherein the object area is with a highest similarity to the second text area; and
    obtaining the target text area by using the text window to select the object area of the first text area.

10. The method according to claim 8, wherein determining whether each first text sub-area of the first set is the same as the corresponding second text sub-area of the second set comprises:
    calculating a similarity value between each first text sub-area of the first set and the corresponding second text sub-area of the second set, and obtaining a set of similarities;
    determining whether each similarity value in the set of similarities is greater than or equal to a predetermined value;
    determining that each first text sub-area of the first set is the same as the corresponding second text sub-area of the second set in response that each of the similarity value in the set of similarities is greater than or equal to the predetermined value; or
    determining that the first text sub-area of the first set is different from the corresponding second text sub-area of the second set in response that any similarity value of the set of similarities is less than the predetermined value.

11. The method according to claim 10, wherein obtaining the set of similarities comprises:
    inputting each first text sub-area of the first set and each second text sub-area of the second set to a preset classifier;
    obtaining a first feature value of each first text sub-area by the preset classifier, and obtaining a second feature value of each second text sub-area by the preset classifier;
    calculating a similarity value between each first feature value and a corresponding second feature value, and
    obtaining the set of similarities based on the similarity value between each first feature value and the corresponding second feature value.

12. The method according to claim 8, wherein the method further comprises:

marking the image to be recognized as a non-qualifying image in response that the first text sub-area of the first set is different from the corresponding second text sub-area of the second set.

13. The method according to claim 12, wherein the method further comprises:

filtering the image to be recognized;

enhancing the first text area; and binarizing the image to be recognized.

14. The method according to claim 13, wherein the method further comprises:

outputting first prompt information to prompt that the image to be recognized is the qualifying image; and outputting second prompt information to prompt that the image to be recognized is the non-qualifying image.

15. A non-transitory storage medium having stored thereon instructions that, when executed by at least one processor of an electronic device, causes the at least one processor to perform an image processing method, the method comprising:

obtaining an image to be recognized and a standard image;

extracting a first text area of the image to be recognized;

obtaining a second text area of the standard image, and extracting a text window based on the second text area, the text window comprising a plurality of sub-windows;

obtaining a target text area of the image to be recognized based on the first text area and the text window;

obtaining a first set of first text sub-areas by dividing the target text area based on the plurality of sub-windows, and obtaining a second set of second text sub-areas by dividing the second text area based on the plurality of sub-windows;

determining whether each first text sub-area of the first set is the same as a corresponding second text sub-area of the second set; and marking the image to be recognized as a qualifying image in response that each first text sub-area of the first set is the same as the corresponding second text sub-area of the second set.

16. The non-transitory storage medium according to claim 15, wherein obtaining the target text area of the image to be recognized based on the first text area and the text window comprises:

extracting the second text area of the standard image;

obtaining an object area of the first text area, wherein the object area is with a highest similarity to the second text area; and obtaining the target text area by using the text window to select the object area of the first text area.

17. The non-transitory storage medium according to claim 15, wherein determining whether each first text sub-area of the first set is the same as the corresponding second text sub-area of the second set comprises:

calculating a similarity value between each first text sub-area of the first set and the corresponding second text sub-area of the second set, and obtaining a set of similarities;

determining whether each similarity value in the set of similarities is greater than or equal to a predetermined value;

determining that each first text sub-area of the first set is the same as the corresponding second text sub-area of the second set in response that each of the similarity value in the set of similarities is greater than or equal to the predetermined value; or determining that the first text sub-area of the first set is different from the corresponding second text sub-area of the second set in response that any similarity value of the set of similarities is less than the predetermined value.

18. The non-transitory storage medium according to claim 17, wherein obtaining the set of similarities comprises:

inputting each first text sub-area of the first set and each second text sub-area of the second set to a preset classifier;

obtaining a first feature value of each first text sub-area by the preset classifier, and obtaining a second feature value of each second text sub-area by the preset classifier;

calculating a similarity value between each first feature value and a corresponding second feature value, and obtaining the set of similarities based on the similarity value between each first feature value and the corresponding second feature value.

19. The non-transitory storage medium according to claim 15, wherein the method further comprises:

marking the image to be recognized as a non-qualifying image in response that the first text sub-area of the first set is different from the corresponding second text sub-area of the second set.

20. The non-transitory storage medium according to claim 19, wherein the method further comprises:

outputting first prompt information to prompt that the image to be recognized is the qualifying image; and outputting second prompt information to prompt that the image to be recognized is the non-qualifying image.

* * * * *